US012722145B2

(12) United States Patent
Chen et al.

(10) Patent No.: US 12,722,145 B2
(45) Date of Patent: Sep. 1, 2026

(54) CATALYTIC MATERIAL FOR TREATING AN EXHAUST GAS PRODUCED BY A NATURAL GAS ENGINE

(71) Applicant: JOHNSON MATTHEY PUBLIC LIMITED COMPANY, London (GB)

(72) Inventors: Hai-Ying Chen, Wayne, PA (US); Joseph Fedeyko, Wayne, PA (US); Jacob Gilmore, Wayne, PA (US); Jing Lu, Wayne, PA (US); Nicholas McNamara, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 653 days.

(21) Appl. No.: 18/067,822

(22) Filed: Dec. 19, 2022

(65) Prior Publication Data

US 2023/0191382 A1 Jun. 22, 2023

Related U.S. Application Data

(60) Provisional application No. 63/265,727, filed on Dec. 20, 2021.

(51) Int. Cl.

| | |
|---|---|
| ***B01J 29/89*** | (2006.01) |
| ***B01D 53/94*** | (2006.01) |
| ***B01J 23/44*** | (2006.01) |
| ***F01N 3/28*** | (2006.01) |
| *B01J 35/56* | (2024.01) |

(52) U.S. Cl.

CPC ............ *B01J 29/89* (2013.01); *B01D 53/944* (2013.01); *B01J 23/44* (2013.01); *F01N 3/2828* (2013.01); *B01D 2255/1023* (2013.01); *B01D 2255/50* (2013.01); *B01J 35/56* (2024.01); *F01N 2330/06* (2013.01); *F01N 2370/04* (2013.01)

(58) Field of Classification Search

None

See application file for complete search history.

(56) References Cited

U.S. PATENT DOCUMENTS

| | | | |
|---|---|---|---|
| 2010/0105542 | A1 | 4/2010 | Lin |
| 2014/0065042 | A1 | 3/2014 | Andersen |
| 2016/0236147 | A1 | 8/2016 | Chen |
| 2016/0310895 | A1 | 10/2016 | Tissler |

FOREIGN PATENT DOCUMENTS

| | | | |
|---|---|---|---|
| JP | H4-193348 | A | 7/1992 |
| JP | 2018-507104 | A | 3/2018 |
| WO | 9947260 | A1 | 9/1999 |
| WO | 2011080525 | A1 | 7/2011 |
| WO | 2011092519 | A1 | 8/2011 |
| WO | 2014195685 | A1 | 12/2014 |
| WO | 2016/130272 | A1 | 8/2016 |

*Primary Examiner* — Jelitza M Perez

(74) *Attorney, Agent, or Firm* — BakerHostetler

(57) ABSTRACT

The present invention relates to a catalytic material for treating an exhaust gas produced by a natural gas engine, which catalytic material comprises a molecular sieve and a platinum group metal (PGM) supported on the molecular sieve, wherein the molecular sieve has a framework comprising silicon, oxygen, titanium and optionally germanium, and has a content of non-titanium heteroatom T-atoms of ≤about 0.20 mol %, wherein the titanium is present in an amount of from 1 to 3 mol %. The present invention further relates to a catalyst article and to a compressed natural gas combustion and exhaust system.

15 Claims, 1 Drawing Sheet

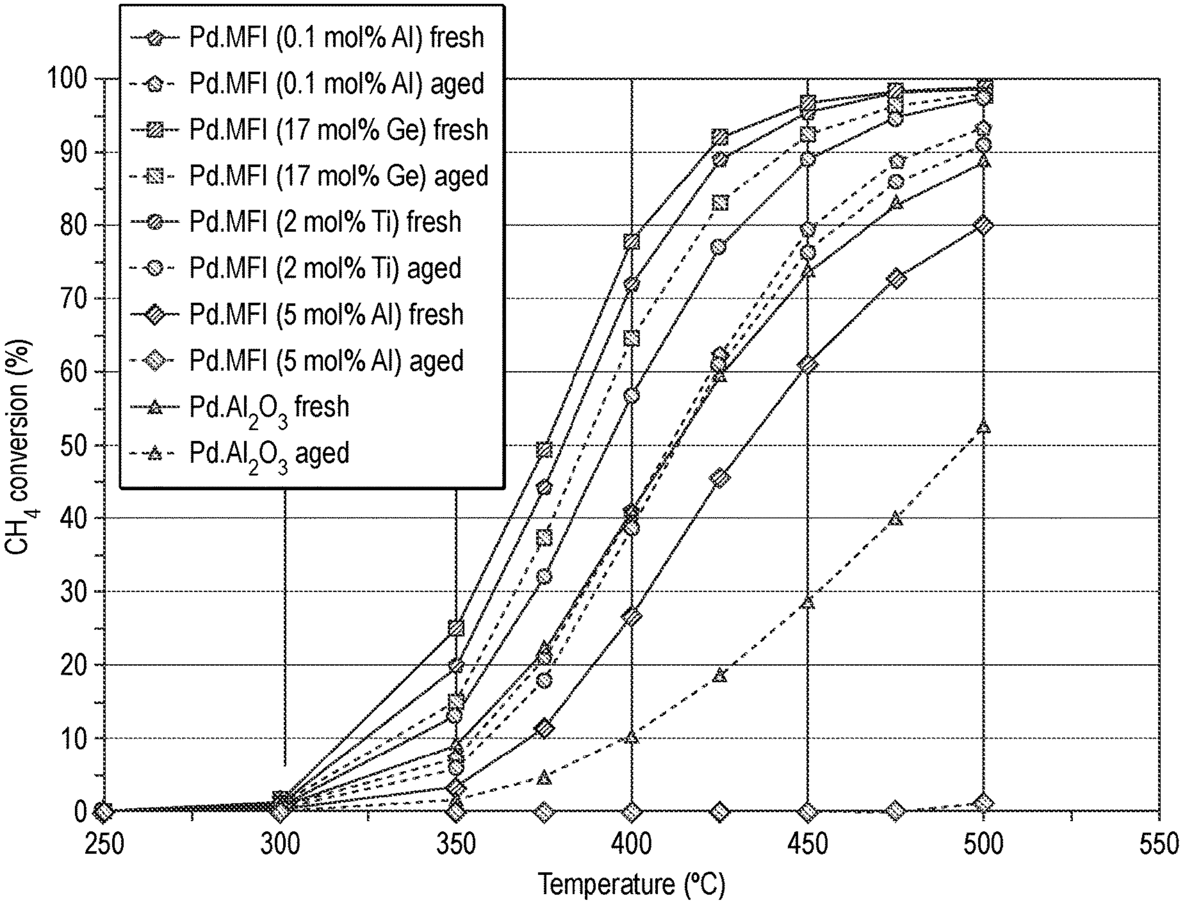
Pd.MFI (0.1 mol% Al) fresh
Pd.MFI (0.1 mol% Al) aged
Pd.MFI (17 mol% Ge) fresh
Pd.MFI (17 mol% Ge) aged
Pd.MFI (2 mol% Ti) fresh
Pd.MFI (2 mol% Ti) aged
Pd.MFI (5 mol% Al) fresh
Pd.MFI (5 mol% Al) aged
Pd.$Al_2O_3$ fresh
Pd.$Al_2O_3$ aged
$CH_4$ conversion (%)
0
10
20
30
40
50
60
70
80
90
100
250
300
350
400
450
500
550
Temperature (°C)

CATALYTIC MATERIAL FOR TREATING AN EXHAUST GAS PRODUCED BY A NATURAL GAS ENGINE

The present invention relates to a catalytic material for treating exhaust gas produced by a natural gas engine, and, in particular, to one which has improved methane oxidation activity and hydrothermal durability.

Natural gas is of increasing interest as an alternative fuel for vehicles and stationary engines that traditionally use gasoline and diesel fuels. Natural gas is composed mainly of methane (typically 70-90%) with variable proportions of other hydrocarbons such as ethane, propane and butane (up to 20% in some deposits) and other gases. It can be commercially produced from oil or natural gas fields and is widely used as a combustion energy source for power generation, industrial cogeneration and domestic heating. It can also be used as a vehicle fuel.

Natural gas can be used as transportation fuel in the form of compressed natural gas (CNG) and liquefied natural gas (LNG). CNG is carried in tanks pressurised to 3600 psi (~248 bar) and has an energy density around 35% of gasoline per unit volume. LNG has an energy density 2.5 times that of CNG and is mostly used for heavy-duty vehicles. It is cooled to liquid form at −162° C. and as a result the volume is reduced 600 fold meaning LNG is easier to transport than CNG. Bio-LNG could be an alternative to natural (fossil) gas, being produced from biogas, derived by anaerobic digestion from organic matter such as landfill waste or manure.

Natural gas has a number of environmental benefits: it is a cleaner burning fuel typically containing few impurities, it contains higher energy (Bti) per carbon than traditional hydrocarbon fuels resulting in low carbon dioxide emissions (25% less greenhouse gas emissions), and it has lower emissions of PM and $NO_x$ compared to diesel and gasoline. Biogas could reduce such emissions further.

Further drivers for the adoption of natural gas include high abundance and lower cost compared to other fossil fuels.

Natural gas engines emit very low PM and $NO_x$ (up to 95% and 70% less, respectively) compared to heavy-duty and light-duty diesel engines. However, exhaust gas produced by NG engines often contains significant quantities of methane (so-called "methane slip"). The regulations which cap emissions from these engines currently include Euro VI and the US Environmental Protection Agency (EPA) greenhouse gas legislation. These impose emissions limits for methane, nitrogen oxides (NOx) and particulate matter (PM).

The two main operating modes used for methane fueled engines are stoichiometric conditions (λ=1) and lean burn conditions (λ≥1.3). Palladium-based catalysts are well known as the most active type of catalyst for methane oxidation under both conditions. The regulated emissions limits for both stoichiometric and lean burn compressed natural gas engines can be met by the application of either palladium-rhodium three-way catalyst (TWC) or platinum-palladium oxidation catalyst respectively.

The growth of this Pd based catalyst technology depends on overcoming challenges in terms of cost and catalyst deactivation due to sulphur, water and thermal ageing.

Methane is the least reactive hydrocarbon and high energy is required to break the primary C—H bond. The ignition temperature of alkanes generally decreases with increasing fuel to air ratio and increasing hydrocarbon chain length which correlates with the C—H bond strength. It is known that with Pd-based catalysts, the light-off temperature for methane conversion is higher than for other hydrocarbons (where "light-off temperature" means the temperature at which conversion reaches 50%).

When operating in stoichiometric conditions (λ=1), a TWC is used as an effective and cost efficient after-treatment system to combust methane. Mostly bimetallic Pd—Rh catalysts with high total platinum group metal (pgm) loadings of >200 $gft^{-3}$ are needed for high levels of methane conversion to meet end of life total hydrocarbon (THC) regulations due to the very low reactivity of this hydrocarbon and catalyst deactivation via thermal and chemical effects. Use of high pgm loadings will improve the overall HC conversion in stoichiometric CNG engines. However, high methane conversions can be achieved with relatively low pgm based on engine calibration, i.e. controlling air to fuel ratio so as to operate near stoichiometric or rich of stoichiometric; the pgm loading can also be varied corresponding to the regional legislation requirement with regards to methane and non-methane conversions.

The reduction of $NO_x$ and oxidation of methane is also more difficult under very oxidising conditions. For lean burn CNG applications, Pd—Pt at high total pgm loadings (>200 $gft^{-3}$) are needed for methane combustion at lower temperatures. Unlike with stoichiometric engines, a reductant also needs to be injected into the exhaust stream in order to be able to reduce $NO_x$ in the presence of excess oxygen. This is normally in the form of ammonia ($NH_3$), and thus lean burn applications require a completely different catalyst system to those that are stoichiometric, where efficient $NO_x$ reduction can be achieved with the use of CO or HC at slightly rich or stoichiometric conditions.

Due to the unreactive (or poorly reactive) nature of methane at lower temperatures, increased methane emissions result during cold start and idle situations, mainly for lean burn where the exhaust temperatures are lower than stoichiometric. In order to improve the reactivity of methane at lower temperatures, one of the options is to use high pgm loadings, which increases costs.

Natural gas catalysts, especially Pd-based catalysts, may suffer from poisoning by water (5-12%) and sulphur (<0.5 ppm $SO_2$ in lube oil) especially under lean conditions, which results in drastic reduction of conversion rate of the catalyst over time. The deactivation due to water is significant due to the formation of hydroxyl, carbonates, formates and other intermediates on the catalyst surface. The activity is reversible and can be recovered completely if water is removed. However, this is impractical as methane combustion feed always contains a high level of water due to the high content of H in methane.

$H_2O$ can be either an inhibitor or a promoter depending on the air-to-fuel ratio, i.e. lambda. Under stoichiometric and reducing conditions, lambda>1, $H_2O$ can act as a promoter for the oxidation of hydrocarbons through the steam reforming reaction in both CNG and gasoline engines. However for lean burn CNG operating at lambdas>1, $H_2O$ acts as an inhibitor for methane oxidation. It is critical to understand the water inhibition effect and design catalysts which are more tolerant to the presence of $H_2O$. This would allow for improvement when trying to control methane emissions from lean burn CNG.

Though the sulphur level is very low in the engine exhaust, Pd-based catalysts deactivate significantly upon sulphur exposure due to the formation of stable sulphates. Regeneration of the catalyst in order to restore the activity following sulphur poisoning is challenging and will usually require high temperatures, rich operation or both. This is easily achievable in stoichiometric operation but more difficult in lean burn. A lean burn vehicle operates with a much higher air-to-fuel ratio than a stoichiometric vehicle and will need injection of a much higher concentration of reductant to switch to rich operation. Thermal deactivation resulting from a high level of misfire events due to poor engine transient control and ignition systems destroys the catalyst and correspondingly leads to a high level of exhaust emissions.

The palladium-containing catalyst deactivates under both lean and stoichiometric conditions, but sulphur poisoning has a more dramatic impact than thermal ageing in lean operation. Sulphur poisoning can be improved by the addition of small amounts of Pt to the Pd catalyst. This is because the sulphur inhibition due to formation of palladium sulphates can be reduced significantly on addition of Pt. However, the addition of Pt further increases the costs.

US2016/0236147 relates to a catalytic material for treating an exhaust gas produced by a natural gas engine, which catalytic material comprises a siliceous zeolite with a content of heteroatom T-atoms of ≤0.20 mol %, where the heteroatom may optionally comprise titanium. The content of this document is incorporated herein by reference.

Accordingly, there is a desire for the provision of an improved system for natural gas combustion and exhaust gas treatment to reduce methane emissions by tackling catalyst deactivation, such as by sulphur, water and thermal ageing, without increasing the cost of the catalyst. It is an object of the present invention to address this problem, tackle the disadvantages associated with the prior art, or at least provide a commercially useful alternative thereto.

According to a first aspect there is provided:

a catalytic material for treating an exhaust gas produced by a natural gas engine, which catalytic material comprises a molecular sieve and a platinum group metal (PGM) supported on the molecular sieve, wherein the molecular sieve has a framework comprising silicon, oxygen, titanium and optionally germanium, and has a content of non-titanium heteroatom T-atoms of about 0.20 mol %, wherein the titanium is present in an amount of from 1 to 3 mol %.

The inventors have unexpectedly discovered that this catalytic material employing a content of titanium of from 1 to 3 mol % has advantageous oxidative activity toward methane, particularly when the methane is part of an exhaust gas containing an excess of oxygen. The catalytic material can achieve high methane conversion efficiency at relatively low temperatures compared to conventional oxidation catalysts. The catalytic material has good thermal stability and on-stream stability in the presence of the gas mixture and water vapour.

The catalytic material of the invention shows surprisingly good oxidative activity toward methane. It may also have a low methane light-off temperature. To achieve satisfactory methane conversion activity, heating the catalytic material to high temperatures may not be necessary.

Another advantage of the catalytic material of the invention is that it has good thermal stability, particularly under hydrothermal conditions (i.e. in the presence of water vapour). When the catalytic material is used at relatively high temperatures, the oxidative activity of the catalytic material toward methane does not significantly deteriorate.

A further advantage provided by the catalytic material of the invention is that at relatively low temperatures (e.g. <500° C.), the on-stream activity in the presence of water vapour does not decline as observed in alumina-supported catalysts.

In the following passages different aspects/embodiments are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention relates to a catalytic material for treating an exhaust gas produced by a natural gas engine. That is, the catalytic material is for the catalytic treatment of exhaust gases from a natural-gas combustion engine in order to convert or transform components of the gases before they are emitted to the atmosphere in order to meet emissions regulations. When natural gas is combusted it will produce both carbon dioxide and water, but the exhaust gas then also contains an amount of additional methane (and other short chain hydrocarbons) that needs to be catalytically removed before the exhaust is emitted to the atmosphere. The exhaust gases also typically contain significant amounts of water and sulphur that can build up and deactivate the catalyst.

In mobile applications, natural gas combustion may be configured to run in a lean or stoichiometric configuration. By a "mobile application", it is meant that the system may generally be suitable for use in an automobile or other vehicle (e.g. off-road vehicles)—in such systems there may be changes during operation in the fuel supply and demand, depending on operator requirements, such as acceleration. In a mobile application it is generally possible to temporarily run the system in a rich mode, which is associated with a significant increase in temperatures which help to burn off the sulphur poisoning the catalyst and to remove accumulated water.

In stationary systems, natural gas combustion may also be configured to operate under lean or stoichiometric conditions. Examples of stationary systems include gas turbines and power generation systems—in such systems the combustion conditions and fuel composition are generally kept constant for long operating times. This means that, compared to mobile applications, there is less opportunity to have a regeneration step to remove sulphur and moisture contaminants. Therefore, the benefits described herein may be of particular benefit for stationary applications. That is, it is especially desirable to provide a catalyst which has high sulphur and moisture tolerance when there are limited opportunities to regenerate the catalyst.

Although the above "lean" and "stoichiometric" systems are described as "mobile" and "stationary", it should be appreciated that both system types can be used across a range of different applications.

The catalytic material comprises a molecular sieve and a platinum group metal (PGM) supported on the molecular sieve. Excellent oxidation activity may be obtained when the PGM comprises palladium (Pd). Preferably, the platinum group metal (PGM) is selected from the group consisting of palladium (Pd), and a combination of platinum (Pt) and palladium (Pd). The total amount of palladium may be 0.1 to 20 wt %, preferably 0.2 to 15 wt %, more preferably 0.5 to 10 wt %.

When the platinum group metal (PGM) is a combination of platinum (Pt) and palladium (Pd), then the combination of Pt and Pd may be selected from the group consisting of separately supported Pt and Pd, a mixture of Pt and Pd, an alloy of Pt and Pd, and both a mixture and an alloy of Pt and Pd. When the PGM is separately supported Pt and Pd, then the particles of Pt and Pd are supported on separate sites of the molecular sieve. The mixture or alloy of Pt and Pd is preferably bimetallic.

Preferably, the molecular sieve comprises the platinum group metal (i.e. as defined above) as the only transition metal, preferably the only platinum group metal (i.e. no other platinum group metals may be present other than those explicitly recited).

The catalytic material may preferably consist essentially of (i) a platinum group metal (PGM) and/or an oxide thereof; and (ii) a molecular sieve as defined herein; wherein the platinum group metal (PGM) is selected from the group consisting of platinum (Pt), palladium (Pd) and a combination of platinum (Pt) and palladium (Pd).

The PGM is supported on the molecular sieve. The term "supported" in this context refers to PGM that is associated with the molecular sieve. Typically, the PGM is associated with (e.g. as an ion-association or as a covalent association) with the silanol groups of the molecular sieve. Without wishing to be bound by theory, it is believed that the active PGM sites are associated with silanol groups, such as silanol nest sites, and/or terminal Si—OH (or Si—O—) groups, which may be present on an external surface and/or within a cavity of the molecular sieve.

Some of the PGM may be located insides the pores of the molecular sieve. The catalytic material may have at least 1% by weight (i.e. of the amount of PGM of the catalytic material) of the PGM located inside pores of the molecular sieve, preferably at least 5% by weight, more preferably at least 10% by weight. The amount of PGM inside the pores of the molecular sieve can be determined using conventional techniques or by the method described in SAE 2013-01-0531.

The catalytic material may have 75% by weight (i.e. of the amount of PGM of the catalytic material) of the PGM located inside pores of the molecular sieve, preferably 50% by weight.

The molecular sieve has a framework comprising silicon, oxygen and titanium, and has a content of heteroatom T-atoms of about 0.20 mol %.

As is known in the art, the term "T-atom" is an abbreviation for "tetrahedrally coordinated atom", which is present in the framework of the molecular sieve.

The term "heteroatom" as used herein in the context of "T-atoms" refers to atoms that are not silicon, not oxygen and not titanium (i.e. non-silicon, non-titanium, non-oxygen heteroatoms), preferably atoms that are not silicon, not germanium, not titanium and not oxygen (i.e. non-silicon, non-germanium, non-titanium and non-oxygen heteroatoms). The molecular sieve may have a framework that comprises one or more heteroatom T-atom. The heteroatom may, for example, be selected from the group consisting of aluminium (Al), boron (B), gallium (Ga), zinc (Zn), iron (Fe), vanadium (V) and combinations of any two or more thereof. More preferably, the heteroatom is selected from the group consisting of aluminium (Al), boron (B), gallium (Ga), zinc (Zn), iron (Fe) and combinations of any two or more thereof.

The molecular sieve may have a framework consisting essentially of silicon, oxygen, titanium, germanium and heteroatom T-atoms. Preferably, the molecular sieve has a framework consisting essentially of silicon, oxygen, titanium and heteroatom T-atoms. More preferably, the molecular sieve may have a framework consisting essentially of silicon, oxygen and titanium (e.g. as the constituent atoms of the framework), wherein the amount of titanium is as defined herein (e.g. the content of heteroatom T-atoms is 0.00 mol %).

The molecular sieve may preferably have a content of heteroatom T-atoms of <about 0.17 mol %, more preferably about 0.15 mol %, such as <about 0.15 mol %, and even more preferably about 0.12 mol % (e.g. <about 0.12 mol %).

Optionally, the molecular sieve may have a content of heteroatom T-atoms of ≥about 0.001 mol %, preferably ≤about 0.010 mol %, more preferably ≥about 0.020 mol %.

In some instances, the molecular sieve may not have a content of heteroatom T-atoms (i.e. the molecular sieve does not comprise heteroatom T-atoms).

When the molecular sieve has a framework comprising germanium, then the amount of germanium (e.g. germanium T-atoms) may be ≤about 20 mol %, optionally ≤10 mol %.

The titanium is present in the molecular sieve in an amount of from 1 to 3 mol %, preferably 2 mol %.

The molecular sieve may be microporous or mesoporous. In accordance with the IUPAC definitions of "microporous" and "mesoporous" (see Pure & Appl. Chem., 66(8), (1994), 1739-1758), a microporous molecular sieve has pores with a diameter of less than 2 nm and a mesoporous molecular sieve has pores with a diameter of 2 nm to 50 nm.

The molecular sieve may be mesoporous. When the molecular sieve is a mesoporous molecular sieve, then typically the mesoporous molecular sieve may be selected from the group consisting of MCM-41, MCM-48, MCM-50, FSM-16, AMS, SBA-1, SBA-2, SBA-3, SBA-15, HMS, MSU, SBA-15 and KIT-1.

Typically, the molecular sieve, particularly when the molecular sieve is microporous, has a framework type selected from the group consisting of AEI, AFI, AFX, ANA, AST, ASV, ATS, BCT, BEA, BEC, BOF, BOG, BRE, CAN, CDO, CFI, CGS, CHA, -CHI, CON, DAC, DDR, DOH, DON, EAB, EDI, EEI, EMT, EON, EPI, ERI, ESV, ETR, EUO, FAR, FAU, FER, GON, HEU, IFR, IFW, IFY, IHW, IMF, IRN, IRR, -IRY, ISV, ITE, ITG, ITH, ITN, ITR, ITT, ITV, ITW, IWR, IWS, IWV, IWW, JOZ, KFI, LEV, LOV, LTA, LTF, MAZ, MEI, MEL, MEP, MER, MFI, MFS, MOR, MOZ, MRE, MSE, MSO, MTF, MTN, MTT, MTW, MVY, MWW, NAB, NES, NON, NSI, OBW, OFF, OKO, PAU, PCR, PHI, POS, RHO, -RON, RRO, RSN, RTE, RTH, RUT, RWR, RWY, SEW, SFE, SFF, SFG, SFH, SFN, SFS, SFV, SFW, SGT, SOD, SOF, SSF, -SSO, SSY, STF, STI, STO, STT, STW, -SVR, SVV, SZR, TON, TUN, UFI, UOS, UOV, UTL, UWY, VET, VNI and VSV. Each of the aforementioned three-letter codes represents a framework type in accordance with the "IUPAC Commission on Zeolite Nomenclature" and/or the "Structure Commission of the International Zeolite Association".

It is preferred that the molecular sieve is a zeolite. The zeolite may be referred to as a silica-containing zeolite, such as a siliceous zeolite. The zeolite may be a titaniosilicate zeolite. Thus, the zeolite may be a siliceous (i.e. high silica-containing) zeolites having a low content of heteroatom T-atoms, such as aluminium (Al), boron (B), gallium (Ga), and optionally also zinc (Zn), iron (Fe).

The siliceous zeolite or pure silica zeolite may be a zeolite selected from the tables below.

As is known in the art, a siliceous zeolite has a framework comprising $SiO_4$ tetrahedra.

| Siliceous zeolite | Framework type |
|---|---|
| SSZ-24 | AFI |
| octadecasil | AST |
| SSZ-55 | ATS |
| zeolite beta | BEA |
| ITQ-14 | BEC |
| CIT-5 | CFI |
| chabazite | CHA |
| deca-dodecasil | DDR |
| dodecasil-1H | DOH |
| UTD-1 | DON |
| EU-1 | EUO |
| dealuminated zeolite-Y | FAU |
| ferrierite | FER |
| GUS-1 | GON |
| SSZ-42 | IFR |
| ITQ-4 | IFR |
| ITQ-32 | IHW |
| ITQ-7 | ISV |
| ITQ-3 | ITE |
| ITQ-13 | ITH |
| ITQ-12 | ITW |
| ITQ-24 | IWR |
| ITQ-29 | LTA |
| ZSM-11 | MEL |
| silicalite | MFI |
| SSZ-61 | — |
| ZSM-5 | MFI |
| MCM-35 | MTF |
| ZSM-39 | MTN |
| dodecasil-3c | MTN |
| CF-4 | MTN |
| ZSM-23 | MTT |
| ZSM-12 | MTW |
| ITQ-1 | MWW |
| MCM-22 | MWW |
| SSZ-35 | MWW |
| nonasil | NON |
| RUB-41 | RRO |
| RUB-3 | RTE |
| RUB-10 | RUT |
| RUB-24 | RWR |
| SSZ-73 | SAS |
| sigma-2 | SGT |
| sodalite trioxane | SOD |
| sodalite ethylene glycol | SOD |
| SSZ-35 | STF |
| ITQ-9 | STF |
| MU-26 | STF |
| SSZ-23 | STT |
| theta-1 | TON |
| SSZ-26 | — |
| SSZ-31 | — |

It is generally preferred that the molecular sieve, particularly when the molecular sieve is a zeolite, has a framework type selected from the group consisting of AEI, ANA, ATS, BEA, CDO, CFI, CHA, CON, DDR, ERI, FAU, FER, GON, IFR, IFW, IFY, IHW, IMF, IRN, -IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, -SSO, SSY, STF, STO, STT, -SVR, SVV, TON, TUN, UOS, UOV, UTL, UWY, VET, VNI. More preferably, the molecular sieve or zeolite has a framework type selected from the group consisting of BEA, CDO, CON, MEL, MWW, MFI and FAU, even more preferably the framework type is selected from the group consisting of BEA and MFI. Most preferably, the zeolite has an MFI framework.

The zeolite may be selected from a small pore zeolite (i.e. a zeolite having a maximum ring size of eight tetrahedral atoms), a medium pore zeolite (i.e. a zeolite having a maximum ring size of ten tetrahedral atoms) and a large pore zeolite (i.e. a zeolite having a maximum ring size of twelve tetrahedral atoms).

Various methods are known in the art for preparing molecular sieves, particularly zeolites, with a high silica content (e.g. a high SAR), and a specific framework type and pore diameter. Numerous methods are also known for preparing a transition metal, such as a platinum group metal, supported on a zeolite. See, for example, WO 2012/166868.

The molecular sieve or zeolite may be a small pore molecular sieve or zeolite. The small pore molecular sieve or zeolite preferably has a Framework Type selected from the group consisting of AEI, AFX, ANA, CDO, CHA, DDR, EAB, EDI, EPI, ERI, IHW, ITE, ITW, KFI, LEV, MER, NSI, PAU, PHI, RHO, RTH, UFI and VNI. More preferably, the small pore molecular sieve or zeolite has a Framework Type that is CHA, CDO or DDR.

The molecular sieve or zeolite may be a medium pore molecular sieve or zeolite. The medium pore molecular sieve or zeolite preferably has a Framework Type selected from the group consisting of MFI, MEL, MWW and EUO. More preferably, the medium pore molecular sieve or zeolite has a Framework Type selected from the group consisting of MFI, MEL and MWW, such as MFI.

The molecular sieve or zeolite may be a large pore molecular sieve or zeolite. The large pore molecular sieve or zeolite preferably has a Framework Type selected from the group consisting of AFI, CON, BEA, FAU, MOR and EMT. More preferably, the large pore molecular sieve or zeolite has a Framework Type selected from the group consisting of AFI, BEA, CON and FAU, such as BEA.

Preferably, the molecular sieve or zeolite is a solid. More preferably, the molecular sieve or zeolite is in a particulate form.

When the molecular sieve or zeolite is in a particulate form, then typically the molecular sieve or zeolite has a D50 of 0.1 to 20 microns (e.g. 5 to 15 microns), such as 0.2 to 15 microns (e.g. 0.2 to 10 microns or 7.5 to 12.5 microns). It is preferred that the D50 is 0.5 to 10 microns. For the avoidance of doubt, the D50 (i.e. median particle size) measurement can be obtained by Laser Diffraction Particle Size Analysis using, for example, a Malvern Mastersizer 2000. The measurement is a volume-based technique (i.e. D50 may also be referred to as DV50 (or D(v,0.50)) and applies a mathematical Mie theory model to determine a particle size distribution.

It has been found that when the molecular sieve or zeolite has a small particle size distribution (i.e. a lower D50), then the catalytic material has higher activity and hydrothermal durability than a catalytic material comprising a molecular sieve or zeolite having a larger particle size distribution. Without wishing to be bound by theory, it is believed that the silanol group sites of the molecular sieve or zeolite are more accessible to the platinum group metal as the particle size of the molecular sieve or zeolite decreases. The catalytic material may, however, show better durability when the molecular sieve or zeolite has a larger particle size distribution.

Preferably, the molecular sieve has a SAR of 1200. It may be preferable that the SAR is 1300, such as ≥1500 (e.g. ≥1700), more preferably ≥2000, such as ≥2200. In particular, when a heteroatom T-atom is aluminium, the molecular sieve or zeolite may have a SAR of ≥1200. It may be preferable that the SAR is ≥1300, such as ≥1500 (e.g. ≥1700), more preferably ≥2000, such as ≥2200.

The catalytic material of the invention is particularly advantageous when the zeolite has an abundance of silanol groups. Preferably, the molecular sieve comprises at least 0.010 mmol/g of silanol groups. More preferably, the molecular sieve comprises at least 0.020 mmol/g of silanol groups (e.g. at 0.030 mmol/g silanol groups). The amount of silanol groups can be measured using a K-uptake method, such as the K-uptake method described in the Examples. It has been found that when the molecular sieve, particularly the zeolite, contains a substantial number of silanol groups advantageous oxidation activity can be obtained. It is preferred that molecular sieve or zeolite comprises silanol groups, wherein the silanol groups have an on-set decomposition temperature≥500° C. The on-set decomposition temperature can be measured by differential scanning calorimetry.

A molecular sieve or zeolite having silanol groups can be obtained by removal of organic templates during the synthesis of the molecular sieve or zeolite or by removal of heteroatoms (e.g. Al, B, Ga, Zn, etc) from the molecular sieve or zeolite by a post-synthesis treatment. In some instances, the silanol groups may be an intrinsic part of the molecular sieve or zeolite framework.

The presence of silanol groups may be determined using FTIR spectroscopy.

According to a further aspect, there is provided a catalyst article comprising the catalytic material described herein in or on a substrate.

A catalyst article is a component suitable for use in an exhaust gas system. Typically such articles are honeycomb monoliths, which may also be referred to as “bricks”. These have a high surface area configuration suitable for contacting the gas to be treated with a catalyst material to effect a transformation or conversion of components of the exhaust gas. Other forms of catalyst article are known and include plate configurations, as well as wrapped metal catalyst substrates. The catalyst article described herein is suitable for use in all of these known forms, but is especially preferred that it takes the form of a honeycomb monolith as these provide a good balance of cost and manufacturing simplicity.

The catalyst article is for the treatment of an exhaust from a natural gas combustion engine. That is, the catalyst article is for the catalytic treatment of exhaust gases from a natural-gas combustion engine in order to convert or transform components of the gases before they are emitted to the atmosphere in order to meet emissions regulations. When natural gas is combusted it will produce both carbon dioxide and water, but the exhaust gas also contains an amount of additional methane (and other short chain hydrocarbons) that needs to be catalytically removed before the exhaust is emitted to the atmosphere. The exhaust gases also typically contain significant amounts of water and sulphur that can build up and deactivate the catalyst.

The catalyst article may be prepared by applying a washcoat onto the surface of a substrate and/or by extrusion. The catalyst article can be manufactured by preparing a washcoat and applying it onto a substrate using methods known in the art (see, for example, our WO 99/47260, WO 2011/080525 and WO 2014/195685). Methods of catalyst articles by extrusion are also known (see, for example, our WO 2011/092519).

The catalytic material may be disposed or supported on the substrate (e.g. the catalytic material is applied to a surface of the substrate in a washcoat). The catalytic material may be disposed directly on to the substrate (i.e. the catalytic material is in contact with a surface of the substrate). Additionally or alternatively, the catalytic material may be dispersed in the substrate (e.g. the catalytic material is part of an extrudate that is used to form the substrate). Thus, the substrate is an extruded solid body comprising the catalytic material.

It is possible that when the catalytic material is dispersed in the substrate (e.g. the oxidation catalyst is an extruded product) that the resulting oxidation catalyst may outperform an oxidation catalyst where the same catalytic material is washcoated onto the substrate. When the catalytic material is dispersed in the substrate (e.g. the oxidation catalyst is an extruded product), then it may be possible to rapidly desulfate the oxidation catalyst and it may have excellent on-stream stability (e.g. good water and oxygen tolerance) in comparison to an oxidation catalyst that has been manufactured by washcoating the catalytic material onto the substrate.

The extruded solid body may comprise or consists essentially of, (i) 5 to 95% by weight of the catalytic material and (ii) 5 to 95% of at least one component selected from the group consisting of a binder/matrix component, an inorganic fibre and a combination thereof.

The binder/matrix component can be selected from the group consisting of cordierite, a nitride, a carbide, a boride, a spinel, a refractory metal oxide, lithium aluminosilicate, zircon and mixtures of any two or more thereof.

The refractory metal oxide may be selected from the group consisting of optionally doped alumina, silica, titania, zirconia, and mixtures of any two or more thereof. Suitable sources of silica, such as clays, are described in US 2014/0065042 A1.

The inorganic fibre may be selected from the group consisting of a carbon fibre, a glass fibre, a metal fibre, a boron fibre, an alumina fibre, a silica fibre, a silica-alumina fibre, a silicon carbide fibre, a potassium titanate fibre, an aluminium borate fibre and a ceramic fibre.

When the catalytic material is dispersed in the substrate (e.g. the substrate is an extruded solid body comprising the catalytic material), then typically the substrate has a porosity of 35 to 75%. The porosity of the substrate can be determined using conventional methods known in the art, such as mercury porosimetry.

The catalyst article may comprise a total loading of the catalytic material of 0.3 to 5.0 g $in^{-3}$, preferably 0.4 to 3.8 g $in^{-3}$, still more preferably 0.5 to 3.0 g $in^{-3}$ (e.g. 1 to 2.75 g $in^{-3}$ or 0.75 to 1.5 g $in^{-3}$), and even more preferably 0.6 to 2.5 g $in^{-3}$ (e.g. 0.75 to 2.3 g $in^{-3}$).

The substrate may be a flow-through substrate or a filtering substrate. When the substrate is a monolith, then the substrate may be a flow-through monolith or a filtering monolith. The substrate may be a honeycomb monolith.

A flow-through substrate typically comprises a honeycomb substrate (e.g. a metal or ceramic honeycomb substrate) having a plurality of channels extending therethrough, which channels are open at both ends.

A filtering substrate generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the substrate is a filtering substrate, it is preferred that the filtering substrate is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytic material to the exhaust gas.

The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

According to a further aspect, there is provided a compressed natural gas combustion and exhaust system comprising:

(i) a natural gas combustion engine; and (ii) an exhaust treatment system comprising an intake for receiving an exhaust gas from the combustion engine and a catalyst article as described herein arranged to receive and treat the exhaust gas.

A natural gas combustion engine is an engine used for combusting natural gas. Preferably the natural gas combustion engine is a stationary engine, preferably a gas turbine or a power generation system. In stationary applications, natural gas combustion may be configured to operate constantly under lean or stoichiometric conditions. In such systems the combustion conditions and fuel composition are generally kept constant for long operating times. This means that, compared to mobile applications, there is less opportunity to have a regeneration step to remove moisture contaminants. Therefore, the benefits described herein may be of particular benefit for stationary applications. That is, it is especially desirable to provide a catalyst which has high moisture tolerance when there are limited opportunities to regenerate the catalyst. It should be appreciated that both lean and stoichiometric system types can be used across a range of different applications.

An exhaust treatment system is a system suitable for treating an exhaust gas from the combustion engine. The exhaust treatment system comprises an intake for receiving an exhaust gas from the combustion engine and a catalyst article arranged to receive and treat the exhaust gas.

FIGURES

The invention will be described further in relation to the following non-limiting FIGURES, in which:

FIG. 1 shows that the improvement in hydrothermal durability achieved by the present invention.

EXAMPLES

The invention will now be described further in relation to the following non-limiting examples, in which powdered catalyst samples were prepared.

Example 1

The catalyst of Example 1 has a palladium-containing MFI zeolite, which contains 0.1 mol % aluminium. The palladium content is 3 wt %.

The catalyst of Example 1 was prepared by impregnating a powder sample of siliceous MFI zeolite having 0.1 mol % aluminum with a solution of palladium nitrate using a conventional incipient wetness technique. After impregnation, the sample was dried at 80° C. for 5 hours and calcined in air at 500° C. in a static oven for 2 hours.

Example 2

The catalyst of Example 2 has a palladium-containing MFI zeolite, which contains 17 mol % germanium. The palladium content is 3 wt %.

The catalyst of Example 2 was prepared by impregnating a powder sample of siliceous MFI zeolite having 17 mol % germanium with a solution of palladium nitrate using a conventional incipient wetness technique. After impregnation, the sample was dried at 80° C. for 5 hours and calcined in air at 500° C. in a static oven for 2 hours.

Example 3

The catalyst of Example 3 has a palladium-containing MFI zeolite, which contains 2 mol % titanium. The palladium content is 3 wt %.

The catalyst of Example 3 was prepared by impregnating a powder sample of siliceous MFI zeolite having 2 mol % titanium with a solution of palladium nitrate using a conventional incipient wetness technique. After impregnation, the sample was dried at 80° C. for 5 hours and calcined in air at 500° C. in a static oven for 2 hours.

Example 4

The catalyst of Example 4 has a palladium-containing MFI zeolite, which contains 5 mol % aluminium. The palladium content is 3 wt %.

The catalyst of Example 4 was prepared by impregnating a powder sample of siliceous MFI zeolite having 5 mol % aluminum with a solution of palladium nitrate using a conventional incipient wetness technique. After impregnation, the sample was dried at 80° C. for 5 hours and calcined in air at 500° C. in a static oven for 2 hours.

Example 5

The catalyst of Example 5 has palladium supported on alumina. The palladium content is 3 wt %.

The catalyst of Example 5 was prepared by impregnating a powder sample of alumina with a solution of palladium nitrate using a conventional incipient wetness technique. After impregnation, the sample was dried at 80° C. for 5 hours and calcined in air at 500° C. in a static oven for 2 hours.

The methane conversion activity of fresh and aged powdered samples of the catalysts of Examples 1 to 5 were tested in a synthetic catalytic activity test (SCAT) by flowing a gas mixture comprising 1120 ppm $CH_4$, 65 ppm as $C_2H_6$, 800 ppm CO, 9% $O_2$, 10% $H_2O$, 6% $CO_2$, balance $N_2$ with a space velocity of 100,000 h−1 over the catalysts at a range of temperatures (ramped from 250 to 450° C. at a ramp rate of 5° C. per minute). The aged catalysts were obtained by aging in 10% $H_2O$ in air for 40 hours at a temperature of 700° C.

As shown in FIG. 1, employing titanium in an amount of 2 mol % leads to better fresh methane conversion than employing alumina in the palladium-containing MFI zeolite or employing an alumina support material. Furthermore, the fresh and aged activity of such a titanium containing catalyst are very similar thereby demonstrating that the presence of titanium within the molecular sieve in an amount of 2 mol % improves the hydrothermal durability of the palladium-containing zeolite. Improving the hydrothermal durability of the palladium-containing zeolite is particularly advantageous when the palladium-containing zeolite is used for treating exhaust gas from a natural gas engine because this is high in moisture.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

It will be understood that, although the terms "first", "second", etc. may be used herein to describe various elements, layers and/or portions, the elements, layers and/or portions should not be limited by these terms. These terms are only used to distinguish one element, layer or portion from another, or a further, element, layer or portion. It will be understood that the term "on" is intended to mean "directly on" such that there are no intervening layers between one material being said to be "on" another material. Spatially relative terms, such as "under", "below", "beneath", "lower", "over", "above", "upper" and the like, may be used herein for ease of description to describe one element or feature's relationship to another element(s) or feature(s). It will be understood that the spatially relative terms are intended to encompass different orientations of the device in use or operation in addition to the orientation depicted in the figures. For example, if a device as described herein is turned over, elements described as "under" or "below" other elements or features would then be oriented "over" or "above" the other elements or features. Thus, the example term "under" can encompass both an orientation of over and under. The device may be otherwise oriented and the spatially relative descriptors used herein interpreted accordingly.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A catalytic material for treating an exhaust gas produced by a natural gas engine, which catalytic material comprises a molecular sieve and a platinum group metal (PGM) supported on the molecular sieve, wherein the molecular sieve has a framework comprising silicon, oxygen, titanium, and germanium, and has a content of non-titanium heteroatom T-atoms of ≤about 0.20 mol %, wherein the titanium is present in an amount of from 1 to 3 mol %.

2. The catalytic material according to claim 1, wherein the heteroatom T-atom is selected from the group consisting of aluminium (Al), boron (B), gallium (Ga), zinc (Zn), iron (Fe), vanadium (V) and combinations of any two or more thereof.

3. The catalytic material according to claim 1, wherein the framework consists essentially of silicon, oxygen, titanium, germanium, and heteroatom T-atoms.

4. The catalytic material according to claim 1, wherein the molecular sieve is a zeolite.

5. The catalytic material according to claim 1, wherein the total amount of the platinum group metal (PGM) is from 0.01 to 30 wt %.

6. The catalytic material according to claim 5, wherein the platinum group metal (PGM) is selected from the group consisting of palladium (Pd), and a combination of platinum (Pt) and palladium (Pd).

7. The catalytic material according to claim 6, wherein the total amount of palladium is 0.1 to 20 wt %.

8. The catalytic material according to claim 1, wherein the molecular sieve has a SAR of ≥1200.

9. The catalytic material according to claim 1, wherein the molecular sieve comprises at least 0.010 mmol/g of silanol groups.

10. A catalyst article comprising the catalytic material of claim 1 on a substrate.

11. A catalyst article according to claim 10 wherein the catalytic material is provided as a washcoat on the substrate.

12. The catalyst article of claim 11, wherein the washcoat loading is from 1 to 50 g/ft$^3$.

13. A catalyst article comprising the catalytic material of claim 1 dispersed in a substrate.

14. A catalyst article according to claim 10, wherein the substrate is a flow-through substrate or a filtering substrate.

15. A compressed natural gas combustion and exhaust system comprising:

(i) a natural gas combustion engine; and (ii) an exhaust treatment system comprising an intake for receiving an exhaust gas from the combustion engine and a catalyst article according to claim 10 arranged to receive and treat the exhaust gas.

* * * * *